Patented Dec. 26, 1933

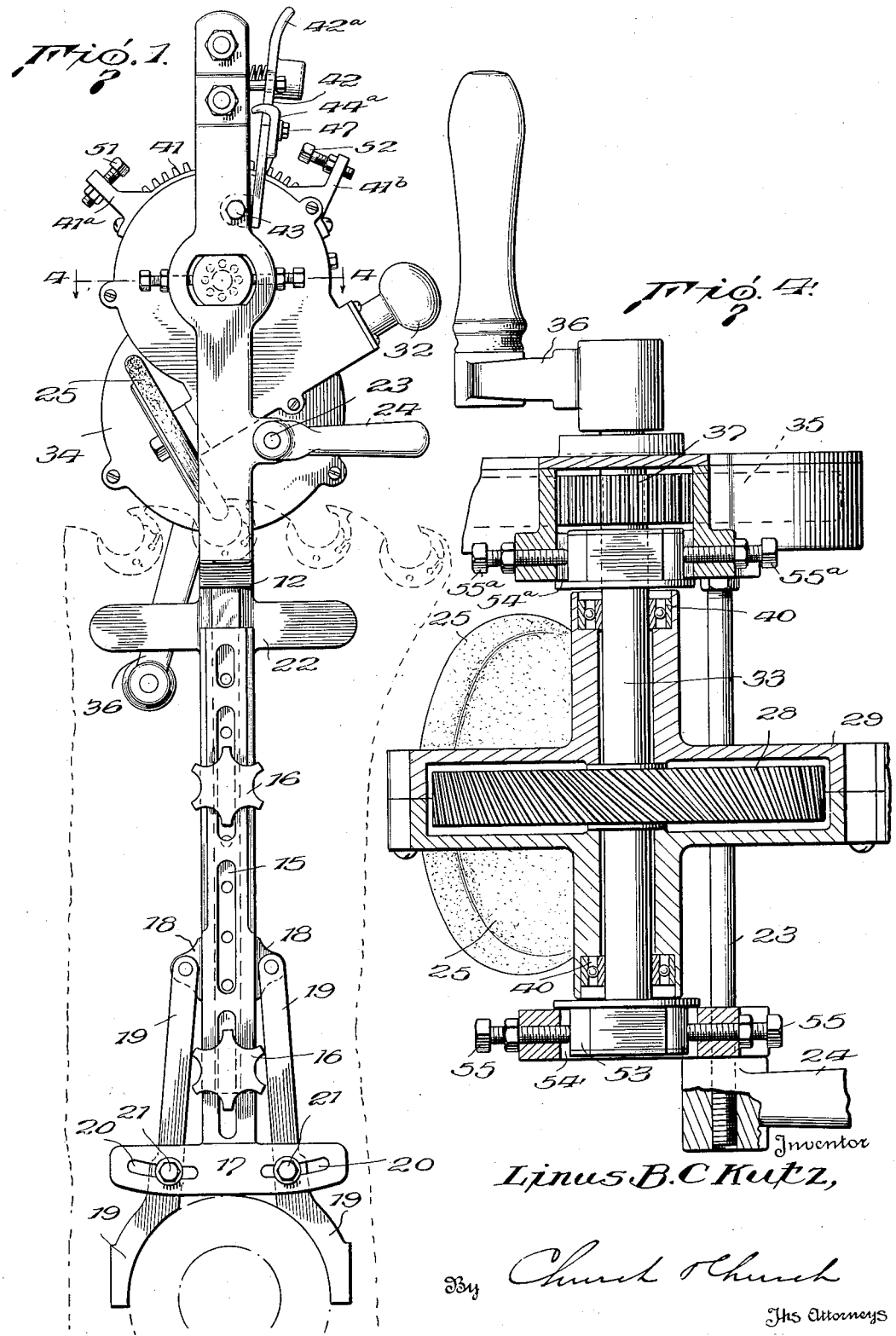

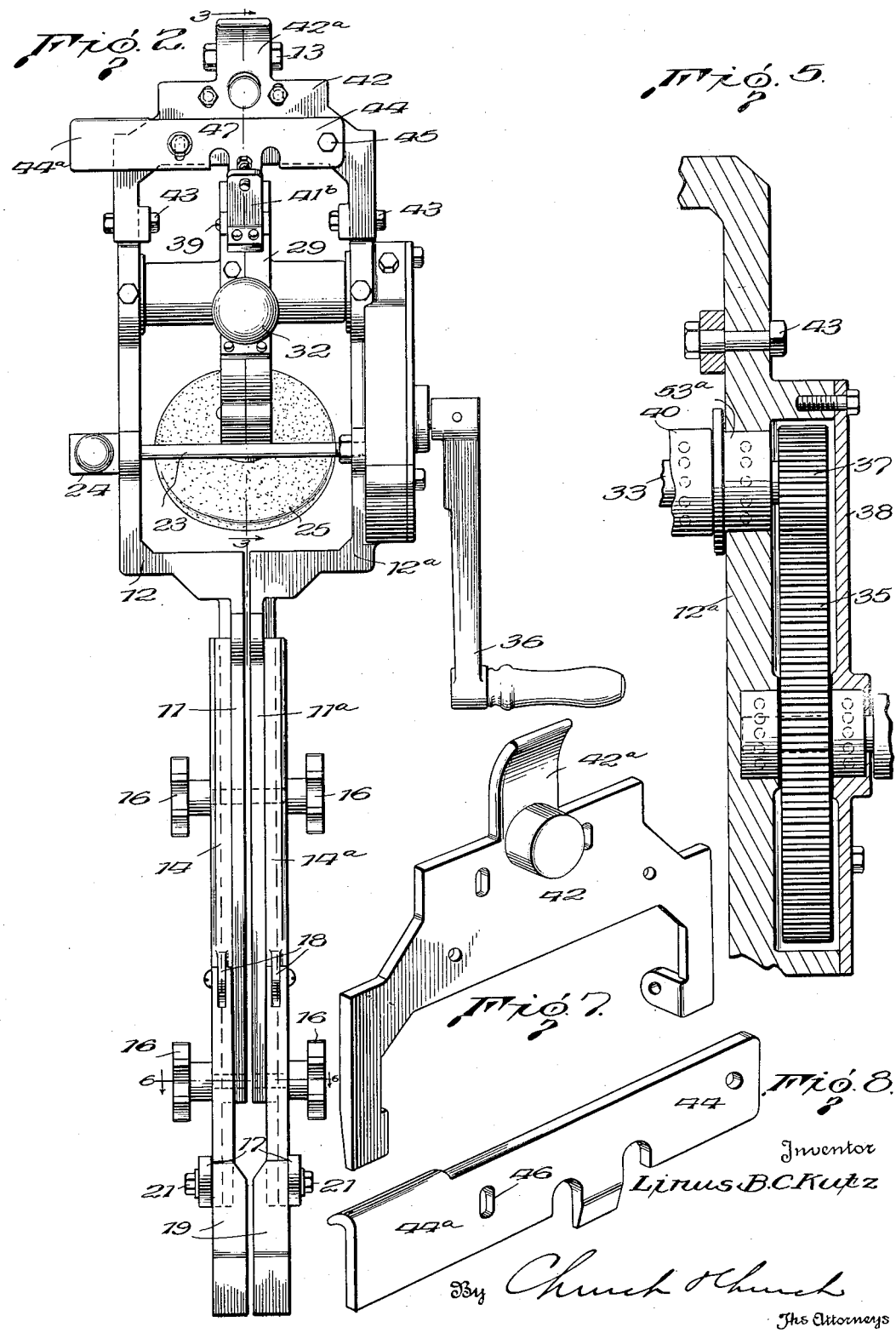

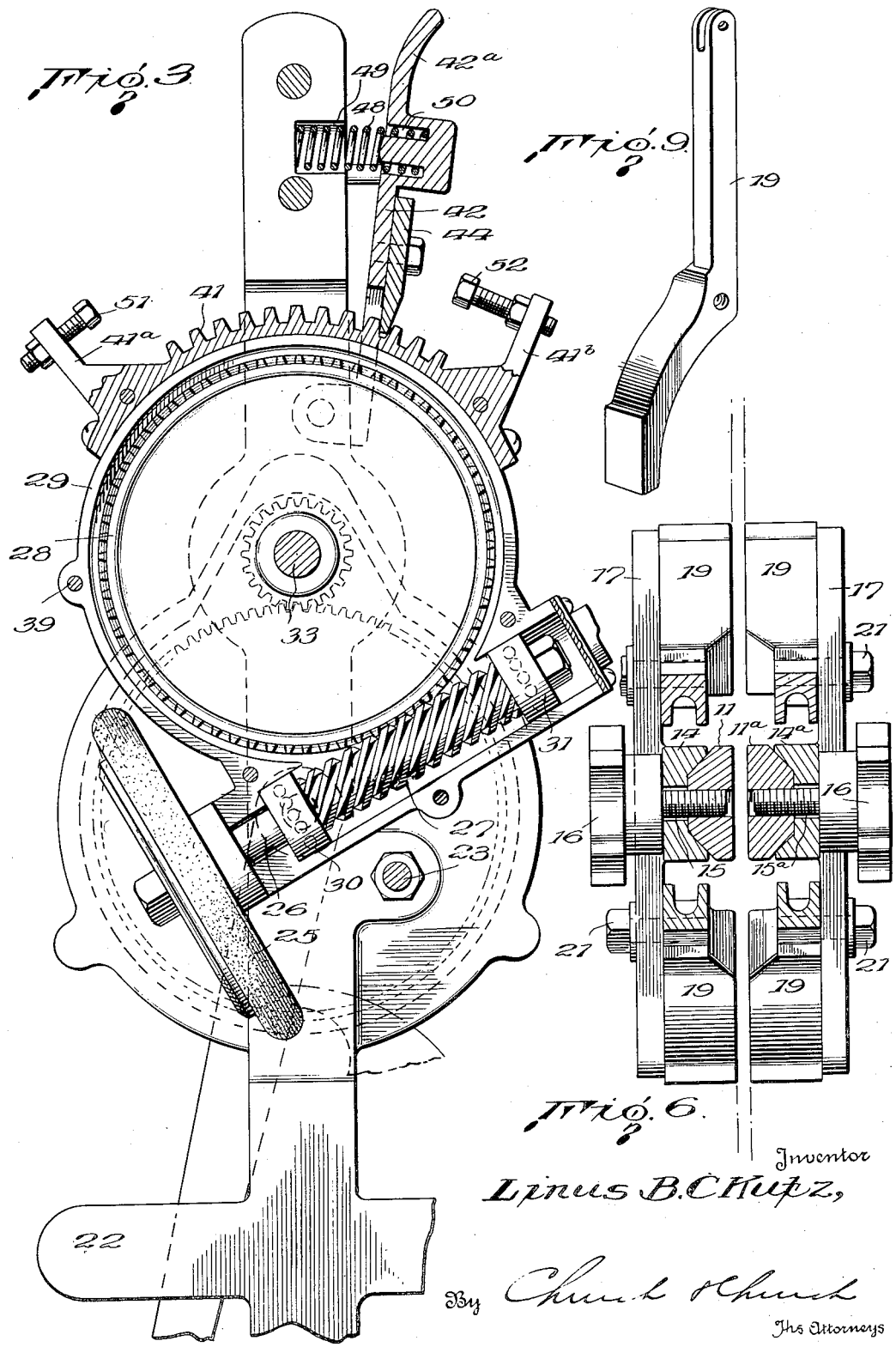

1,941,178

UNITED STATES PATENT OFFICE 1,941,178

SAW SHARPENING MACHINE

Linus B. C. Kutz, Raleigh, N. C.; Anna L. Kutz administratrix of said Linus B. C. Kutz, deceased Application December 6, 1932. Serial No. 646,000

13 Claims. (Cl. 76—40)

My invention relates to saw sharpening machines and has to do, more particularly, with apparatus for sharpening the teeth of circular saws.

The primary object of my invention is to provide a portable machine for accurately and quickly sharpening a circular saw without requiring its removal from the saw arbor.

Another object of my invention is to provide a portable saw-sharpening machine which may be readily and quickly adjusted for use upon circular saws of various sizes.

Another object of my invention is to provide a portable saw-sharpening machine which is applicable for use with equal facility upon either right-hand or left-hand saws, and the standard of which is readily adjustable for accurate mounting upon saw arbors the clamping collars of which are of different sizes and of different shapes.

Another object of my invention is to provide a portable sharpening machine for circular saws which requires no special skill for its operation, and which will accurately renew the cutting edges of the saw teeth in a fraction of the time required by other apparatus heretofore employed for performing the same purpose.

Another object of my invention is to provide a sharpening machine for circular saws which may be operated with any desired amount of lateral drag upon the tooth edge.

Another object of my invention is to provide a portable, manually driven, sharpening machine for circular saws which will renew the edges on saw teeth of the case-hardened inserted type, in situ, that is without removal of the teeth from their sockets in the saw disc.

Another object of my invention is to provide a portable sharpening machine for circular saws which may be set to provide tooth-edges having any desired angle with respect to the saw axis.

Further objects, and objects relating to details and economies of construction and operation will definitely appear to those skilled in the art from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings forming a part of this specification, in which:

Figure 1 is a side elevation of a preferred structural embodiment of my invention;

Fig. 2 is a front elevation of the machine shown in Fig. 1;

Fig. 3 is a central vertical sectional view of the same machine, with portions of the standard omitted, and disclosing in detail the sharpening wheel, drive-gearing, and feeding mechanism therefor;

Fig. 4 is a horizontal sectional view of the machine taken on the line 4—4 of Fig. 1;

Fig. 5 is a vertical sectional view of a portion of the machine, showing the first stage of step-up gearing;

Fig. 6 is a transverse sectional view of the standard taken on the line 6—6 of Fig. 2;

Fig. 7 is a detail perspective view of the pivoted grip member of the feeding mechanism;

Fig. 8 is a detail perspective view of the rack-engaging element of the feeding mechanism; and Fig. 9 is a perspective view of one of the four saw-arbor-engaging feet of the two-legged standard of the machine.

The same reference numerals refer to the same parts throughout the several views.

Broadly my invention, as embodied, consists of a bifurcated standard adapted to straddle the saw disc and rest directly upon the saw arbor, and a sharpening head carried by the standard consisting of an abrasive wheel and a journaled mount therefor by which the abrasive wheel may be progressively swung, at will, into and out of sharpening relation with the several teeth about the periphery of the saw disc.

More specifically, and as indicated by reference numerals in the accompanying drawings, the illustrated preferred embodiment of my invention comprises a bifurcated standard of adjustable length, adapted to straddle the saw disc, consisting of a pair of similar leg portions 11, 11a spaced apart and terminating at their upper ends in rectangular frame-constituting portions 12, 12a, respectively held in assembly by bolts 13. The leg portions 11, 11a are, as shown in Fig. 6, preferably somewhat trapezoidal in cross section and are snugly telescopically engaged by leg extensions 14, 14a which are of channel form complementary to said members 11, 11a. The webs of the channel members 14, 14a are slotted at 15, 15a, and the leg members 11, 11a are provided with threaded apertures in which knurled bolts 16, two upon each leg, are threadedly engaged and extend through the slots 15, 15a, and have shoulders which clamp upon the external surfaces of the channel members 14, 14a. The channel members 14 and 14a terminate at their lower ends in foot portions adjustable for engagement with saw arbors of various diameters. Each channel member 14, 14a, terminates in an integral transverse member 17. Perforate lugs 18 are provided on each channel member at an intermediate point and arbor-engaging foot elements 19 depend pivotally therefrom. Slots 20 are formed in the transverse member 17, and bolts 21, therein disposed, maintain adjustment of the spacing between members 19 on each channel member to snugly engage the saw arbor. To further assure alinement of the entire standard with the saw disc as well as the saw arbor, each leg portion 11, 11a is provided with a wing-like plate 22 which bears against the adjacent cheek of the saw disc. By means of a tie-bolt 23 anchored at one end in the member 12a, extending through the member 12, and provided with a clamp nut 24 threaded thereon, the legs may be clamped rigidly upon the cheeks of the saw disc.

The sharpening mechanism is carried by the portions 12, 12a of the standard and comprises an abrasive wheel 25, preferably of emery, mounted upon a shaft 26 carrying a worm gear 27 meshed with a ring gear 28. The ring and worm gears 28 and 27 are encased within a body member or housing 29 in which bearings 30 and 31 are supported. A knob 32 closes the portion of the body member which houses the worm 27 and serves also as a manual grip for the body member. The ring gear 28 is keyed to a shaft 33 journaled adjacent its ends in bearings received in the support members 12 and 12a. The member 12a has, integrally formed therewith, a second high speed gear box or housing 34 in which is journaled the large spur gear 35, driven by a hand crank 36 and meshed with a small spur gear 37 keyed to the shaft 33. A housing cover plate 38 is detachable from the gear box 34 to permit assembly, inspection and lubrication of the gears 35 and 37. The body member 29 is formed in two sections held in assembly by bolts 39, and each section is provided with a bearing 40 journaled upon the shaft 33. It will be apparent, therefore, that the housing or body 29, together with the worm 27, shaft 26, and wheel 25 may be rotated about the shaft 33 as an axis, and the wheel 25 may thus be inserted between and withdrawn from the teeth of the straddled saw disc at will. Means are provided whereby the angular position of the housing 29 with respect to the standard may be accurately maintained so as to provide identical edge angularity on each sharpening tooth. These means consist of an arcuate rack member 41 mounted upon the periphery of the housing 29, a plate 42 pivotally mounted by bolts 43 upon the standard members 12, 12a, and a detent 44 pivotally mounted at one end upon the plate 42 by a bolt 45. A slot 46 is formed in the detent 44 and permits limited pivotal movement upon the stop 47 on the plate 42. The detent 44 is provided with a manually engageable extension 44a. A spring 48 is provided, which spring is received at its ends in sockets 49 and 50 formed in the members 12, 12a and plate 42, respectively, and by engaging the detent 44 with the rack 41 and grasping the extension 42a of the plate 42 and the upper ends of the members 12, 12a between the palm and fingers of a hand, the body member 29 may be rotated upon the shaft 33 and the abrasive face of the wheel 25 may be fed into edge-renewing contact with the adjacent tooth of the saw disc. Lugs 41a, 41b are provided at the ends of the rack 41, and adjustable stop bolts 51, 52, threaded therein, limit the extent of rotation of body member 29 by reason of abutment with the members 12, 12a and detent 44. The shaft 33 is provided with bearings 53, 53a received in slots 54, 54a and these are slidably adjustable in said slots by means of bolts 55, 55a so that the abrasive face of the wheel 25 may, if desired, be disposed at a slight angle with respect to the axis of the saw.

The machine is employed and operated in the following manner. The clamp nut 24 is backed off sufficiently to permit the legs 11, 11a, and their extensions 14, 14a, to spread apart a distance greater than the thickness of the saw disc. The standard is then placed astride the saw disc and the foot elements 19 are adjusted and clamped by means of the bolts 21 so as to provide a snug fit upon the collars of the saw arbor at each side of the disc. The leg portions 14, 14a, are next similarly adjusted upon the leg portions 11, 11a, and the bolts 16 are tightened to provide legs of the length required for accurately supporting the machine upon a saw of the diameter to be sharpened. The clamp nut 24 is next tightened upon the bolts 23 and the standard parts 22, 11, 11a, are thereby firmly clamped upon the saw disc. The standard should be disposed on the radius of the saw through the tooth to be sharpened, as shown in Fig. 1.

With the standard thus clamped, the rack 41 of the tiltable body member or abrasive wheel bracket 29 is released by lifting the detent 44, and is swung from its inoperative position to the tooth-contacting position shown in Fig. 1, by lifting the grip 32. The detent 44 is then depressed into engagement with one of the teeth of the rack 41 and the wheel 25 is caused to rotate at high speed by turning the crank 36 with the right arm. The left hand of the operator is placed upon the grip 42a of the pivotal feed plate 42 carrying the detent 44 and by squeezing the grip 42a and the upper extremities of the frame portions 12, 12a, between the palm and fingers of the left hand, any desired pressure of the abrasive surface of the wheel 25 against the tooth to be sharpened may be effected. By turning the crank 36 at an easy rate of speed, even the hardest inserted-type tooth may be sharpened in a few seconds.

When a tooth has been sharpened, the detent 44 is lifted, and the body member or bracket 29 is swung back until the stop 51 engages the frame or until the shaft 26 is substantially horizontal, and the detent is lowered to lock the member 29 against rotation. The clamp nut 24 is then loosened and the saw disc is rotated slightly to bring the next tooth into the position previously assumed by the tooth just sharpened. The operation is then repeated and the same procedure is followed with each tooth until all the teeth have been sharpened, whereupon the machine is removed and the saw may be put into use.

Under some conditions it is desirable to sharpen the saw teeth so that their cutting edges are not square with the saw axis, but are beveled or inclined with respect thereto. Likewise, it sometimes is desirable to have alternate teeth inclined oppositely. My machine is especially adapted to sharpen such teeth or to provide such angularity in teeth not so designed originally. As is to be clearly understood, all that is necessary to effect such results is the adjustment of the bolts 55, 55a, to offset the bearings 53 in the slots 54, 54a, of the frame portions 12, 12a, respectively. The shaft 33 will thus be angularly displaced with respect to the plane of the frame and the bevel-cutting of the teeth will be provided in direct proportion to the displacement. Where only alternate teeth are to be beveled similarly, the sharpening procedure is the same as above set forth except that every other tooth is sharpened, the shaft is angularly displaced in the opposite direction, and then the remaining unsharpened teeth are ground.

I am aware that numerous changes may be made in the machine disclosed without departing from the basic concepts of my invention. The standard may be formed of light hollow stampings or made in the form of aluminum or other light castings or forgings. Likewise electric or other power may, if desired, be employed for driving the abrasive wheel. I have, however, found that the manually operated machine disclosed is simple, easy to operate, and very rapid in its work. If desired, a disc file and slow speed gearing may be employed in lieu of the emery wheel and gearing shown. Such equipment is adequate for renewing the teeth of ordinary steel saws. For the increasingly popular inserted tooth saws having case-hardened teeth, however, the disclosed machine is superior.

Numerous other changes within the scope of my invention will appear to those skilled in the art as optional expedients. I, therefore, claim my invention broadly as indicated by the appended claims.

What I claim is:

1. A portable machine for renewing the cutting edges of the teeth of a circular saw without removal of the saw disc from its arbor comprising: a standard mountable directly upon the saw arbor at each side of the saw disc, extending radially from the arbor and terminating in a bracket for supporting the journaled mounting of the sharpening mechanism, sharpening mechanism comprising an abrasive wheel and means for rotating said wheel, and a mounting for said abrasive wheel comprising a member having bearings upon which said wheel is restricted to rotate in a plane substantially perpendicular to the plane of said saw disc, said member being pivotally associated with said bracket so as to be bodily rotatable therein in a plane substantially coincident with the plane of said saw disc, stop means limiting the extent to which said member may be rotated to that necessary to dispose said wheel beyond the periphery of the saw disc, adjustable locking means for maintaining said member so as to assure proper contact of the abrasive face of said wheel with the saw teeth, and manually operable means associated with said locking means for feeding the abrasive face of said wheel against the cutting edges of the teeth.

2. A machine for renewing the cutting edges of the teeth of a circular saw comprising: a support, an abrasive wheel, means for rotating said wheel, and an adjustable mounting for said abrasive wheel carried by said support, said mounting comprising a body of circular form journaled for rotation about its center on an axis substantially parallel to the axis of the saw to be sharpened, bearings in said body supporting said wheel for rotation in a plane substantially perpendicular to the plane of the saw disc on an axis eccentrically disposed with respect to said body, latch means for locking said body against rotation so as to present the abrasive face of said wheel at the desired angle with respect to a tooth, and manually controlled feeding means for moving said abrasive face into the desired contact with the cutting edge of the tooth.

3. A machine for renewing the cutting edges of the teeth of a circular saw comprising: a support, an abrasive wheel, means for rotating said wheel, and an adjustable mounting for said abrasive wheel carried by said support, said mounting comprising a body of circular form journaled for rotation about its center on an axis substantially parallel to the axis of the saw to be sharpened, bearings in said body supporting said wheel for rotation in a plane substantially perpendicular to the plane of the saw disc on an axis eccentrically disposed with respect to said body, latch means for locking said body against rotation so as to present the abrasive face of said wheel at the desired angle with respect to a tooth, said latch means comprising an arcuate rack on the periphery of said body and a detent carried by said support and engageable with the teeth of said rack, and feeding means for moving said abrasive face into the desired contact with the cutting edge of a saw tooth comprising a grip portion on said detent and a yieldable spring permitting limited displacement of said rack-engaged detent effecting slight rotation of said body.

4. In a saw-sharpening machine, a frame, an abrasive wheel, a bracket extending across said frame and rotatable therein, said wheel being mounted on the bracket to rotate on an axis at right angles to the axis of the bracket, means to adjust the position of the axis of rotation of the bracket angularly with respect to the frame, means to rotate said bracket, and means for rotating said wheel on its axis.

5. In a saw-sharpening machine, a frame having spaced sides, an abrasive wheel, a pair of bearings, means supporting said bearings in the sides of said frame and adapted to adjust the bearings angularly with respect to said frame and at right angles with respect to the axis of said bearings, a bracket rotatably mounted on said bearings, said wheel being mounted on said bracket to rotate on an axis at right angles to the axis of rotation of the bracket, means for rotating said bracket, and means for rotating said wheel on its axis.

6. In a saw-sharpening machine, a frame, an abrading wheel, a bracket extending across said frame and rotatable therein, said wheel being mounted on said bracket to rotate on an axis at right angles to the axis of said bracket, means for rotating said bracket, means for supporting said bracket and permitting its adjustment at right angles to its axis of rotation, a shaft extending axially through said bracket, gearing coupling said shaft and wheel, and means for rotating said shaft including a hand-crank.

7. In a saw-sharpening machine, a frame having spaced sides, an abrasive wheel, a pair of bearings, means supporting said bearings in the sides of said frame and arranged to render said bearings angularly adjustable with respect to said frame, a bracket rotatably mounted upon said bearings, said wheel being mounted on said bracket for rotation on an axis at right angles to the axis of rotation of said bracket, means for rotating said bracket, a shaft extending coaxially through said bracket, gearing connecting said shaft and wheel and means for rotating said shaft including a hand-crank.

8. In a saw-sharpening machine, a frame, an abrasive wheel, means for tiltably supporting said wheel in said frame including a member capable of oscillation upon an axis extending transversely of said frame, means for adjusting said axis of oscillation angularly with respect to said frame, means for rotating said wheel, and manually controllable means for determining the tilt of said wheel.

9. In a saw-sharpening machine, a frame having spaced sides, an abrasive wheel, a pair of bearings, means supporting said bearings in the sides of said frame and capable of adjustment to dispose said bearings angularly with respect to said frame, a bracket rotatably mounted in said bearings, said wheel being mounted on said bracket to rotate on an axis at right angles to the axis of rotation of said bracket, means for rotating said bracket, means for supporting said bracket in said frame and permitting said bracket to be adjusted at right angles to its axis of rotation, means for rotating said wheel on its axis, and means for adjustably limiting the rotation of said bracket.

10. In a saw-sharpening machine, a frame, an abrasive wheel, a bracket extending across said frame and rotatable therein, said wheel being mounted on the bracket to rotate on an axis at right angles to the axis of said bracket, means for rotating said bracket, means for supporting said bracket in said frame and permitting said bracket to be adjusted at right angles to its axis of rotation, a shaft extending axially through said bracket, gearing connecting said shaft and wheel, means for rotating said shaft including a hand-crank, and means for adjustably limiting the extent to which said bracket may be rotated in said frame.

11. In a saw-sharpening machine, a frame having spaced sides, an abrasive wheel, a pair of bearings, means supporting said bearings upon the sides of said frame and adjustable to displace said bearings angularly with respect to said frame, a bracket rotatably mounted on said bearings, said wheel being mounted on said bracket to rotate on an axis at right angles to the axis of rotation of said bracket, means operable to rotate said bracket, means for rotating said wheel, telescopic legs depending from said frame and arranged to clamp the cheeks of a saw disc, and means for securing the telescopic adjustment of said legs, said legs terminating at their lower ends in yokes adapted for support upon the arbor of the saw.

12. A portable machine for renewing the cutting edges of the teeth of a circular saw without removal of the disc from its arbor comprising: a support adapted to straddle the saw disc consisting of a head disposable at the periphery of the saw disc and a pair of similar legs spaced apart a distance greater than the maximum thickness of the saw disc and thereby freely disposable at each side of the saw disc without interference from the teeth thereof, an arched foot upon the end of each leg adapted to straddle and rest upon the arbor collar at each side of the disc in free, unclamped relation with said collar, each of said legs consisting of a pair of members adjustably extensible to any desired length and each of said arched feet being independently adjustable to snugly straddle its associated arbor collar, whereby the support may be squarely, steadily and equally supported from both arbor collars regardless of the diameter of the saw disc and regardless of differences in size or shape of the arbor collars which secure the saw disc, an abrasive wheel carried by said head, and means for rotating said wheel with its abrasive face contacting the cutting edge of a saw tooth and restricted to a plane substantially perpendicular to the plane of the saw disc.

13. A portable machine for renewing the cutting edges of the teeth of a circular saw without removal of the saw disc from its arbor comprising: a support adapted to straddle the saw disc consisting of a head disposable at the periphery of the saw disc and a pair of spaced legs attached to said head and disposable one at each side of said saw disc, a forked foot upon the end of each leg adapted to straddle and firmly rest upon arbor collars of different sizes, each of said legs being independently extensible and consisting of a pair of members adjustable to any desired length to compensate for any difference in size existing between the arbor collars at the two sides of the disc thereby permitting equal and steady support of the machine from both arbor collars regardless of differences in their diameters, an abrasive wheel carried by said head, and means for rotating said wheel with its abrasive face contacting the cutting edge of a saw tooth and restricted to a plane substantially perpendicular to the plane of the saw disc.

LINUS B. C. KUTZ.